Aug. 29, 1967    M. W. KOLZE    3,338,434
SWEEP ARM BIN UNLOADER
Filed Feb. 25, 1965    2 Sheets-Sheet 1

INVENTOR.
MELVIN W. KOLZE
BY  *Hill, Sherman, Meroni, Gross & Simpson*    ATTORNEYS

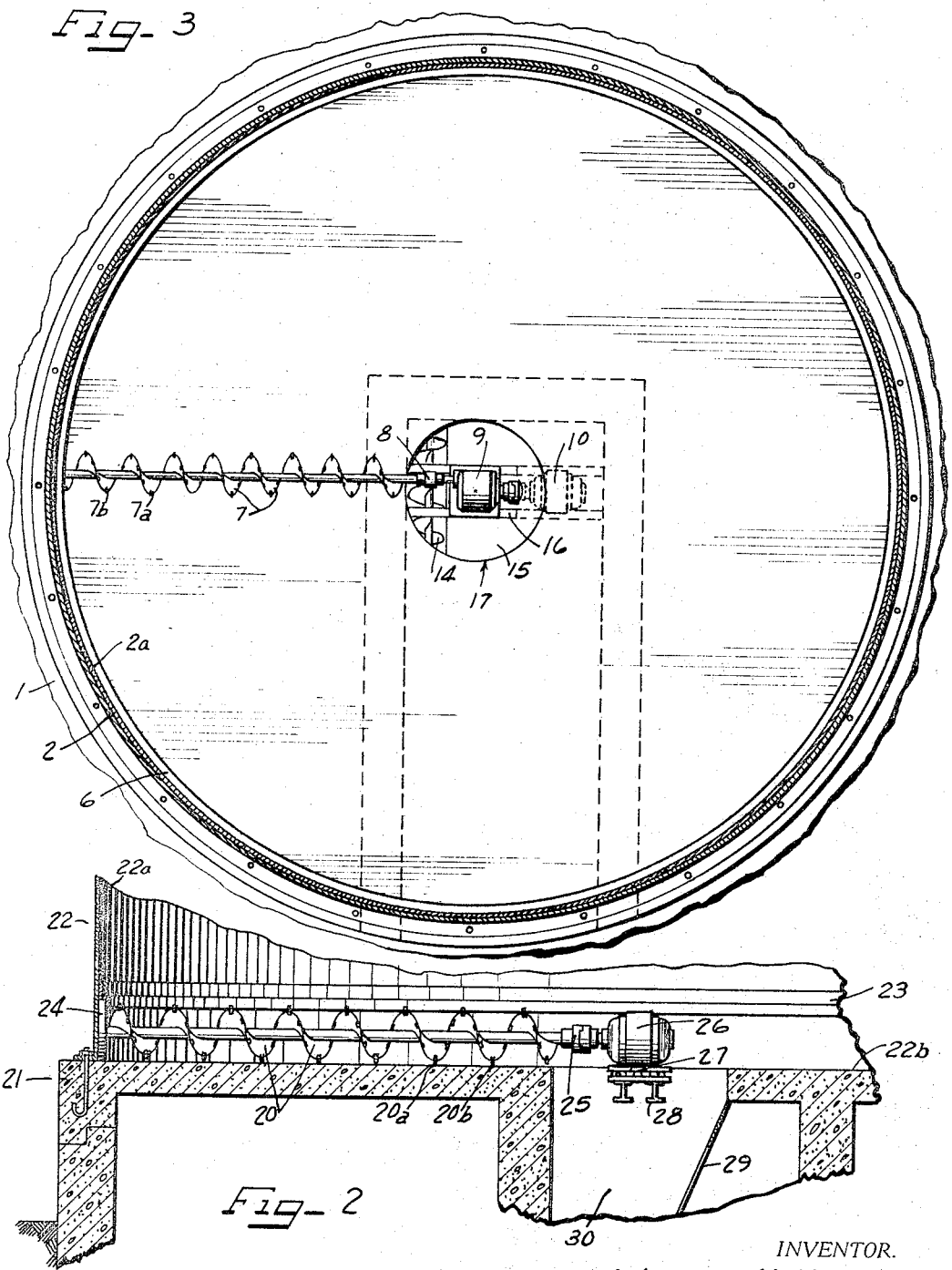

United States Patent Office 3,338,434
Patented Aug. 29, 1967

3,338,434
SWEEP ARM BIN UNLOADER
Melvin W. Kolze, 1011 Thomas, Forest Park, Ill. 60130
Filed Feb. 25, 1965, Ser. No. 435,223
10 Claims. (Cl. 214—17)

This invention relates to an improved mechanism suitable for use in connection with facilitating the unloading of materials from containers wherein such materials are stored. More particularly, this invention relates to a bottom unloading mechanism operation useful for the unloading of particulated materials from storage containers.

Many materials such as sawdust, chips, hogged bark, flour, and tanbark are stored in containers, tanks, bins or the like and because of their high viscosity or because they tend to pack into lumps, agglomerates, or the like, will not flow easily from the containers by means of gravity. It will be appreciated that some materials may be unloaded or removed from the top of the storage bins and, of course, with these materials gravity flow is not a problem. However, some materials, such as flour, must be removed from the container on a first-in, first-out basis. Flour is loaded into containers or bins from the top and hence must be removed from the bottom in order to comply with the aforementioned requirements. Further, it is much simpler to unload many materials, if possible, from the bottom of storage bins. Many moisture containing materials tend to become damaged through decay, mildew, or the like, upon long periods of storage and it is therefore desirable to first remove that portion of the material that has been stored the greatest length of time. Moreover, it is highly desirable to remove all of the material uniformly from the entire bottom surface of the storage bin.

Unloaders which are presently in use, and which permit unloading of a container from the bottom thereof generally are complicated mechanisms and are expensive to manufacture, costly to maintain and do not function adequately. Further, unloaders which are presently in use and which permit unloading of a container from the bottom thereof are difficult to clean, and where such unloaders are employed, for example, to unload foodstuff from a container, it is very important that the unloaders be kept clean at all times. Certain bottom unloader mechanisms use conveyer screws. A reoccurring and difficult problem in screw type bin unloaders has been arcing and/or breaking of the shaft of the conveyor screws used to unload the particulated material. Materials stored in a storage bin exert a downward pressure on the conveyer screw. When the screw is rotated about its longitudinal and vertical axes there is a natural tendency of the conveyer screw to "climb" into the pile of material through the action of the screw digging into the particulated material. One theory explaining this phenomenon may be described as follows: Storage bins are normally of substantial height and when filled with a material there is a substantial amount of pressure, or weight, pressing upon the conveyer screw. The conveyer screw is then not capable of rotating about its vertical axis in a parallel plane but instead seeks the course of less resistance, i.e., by climbing into the material. As the conveyer screw climbs higher into the pile of material, there is a natural tendency to bend its own shaft and thereby affect either a permanent bend in the shaft or a breaking thereof.

Accordingly, it is an important object of my invention to provide a simple apparatus useful in facilitating the unloading of material from the bottom of a container.

It is another object of my invention to provide a bottom unloading mechanism which may be readily manufactured at a low cost.

It is a further object of my invention to provide a bottom unloading mechanism which requires little or no maintenance.

It is a still further object of my invention to provide a bottom unloading mechanism wherein the rate of unloading may be readily controlled.

It is yet a further object of my invention to provide a bottom unloading mechanism employing a conveyer screw wherein the shaft of the conveyer screw remains substantially parallel to the bottom of the container.

A more specific object of my invention is to provide a bottom unloading mechanism capable of removing uniformly, material from the entire bottom surface of a container without bending or breaking such unloading mechanism.

Other and further objects, features and advantages of the present invention will become more apparent to those skilled in the art from the following detailed disclosure thereof and the drawings attached hereto and made a part hereof.

On the drawings:

FIGURE 2 is a fragmentary detailed sectional view showing another embodiment of the invention; and FIGURE 3 is a horizontal sectional view of a bottom unloading mechanism taken substantially along the line III—III of FIGURE 1.

As shown on the drawings:

Figure 1:
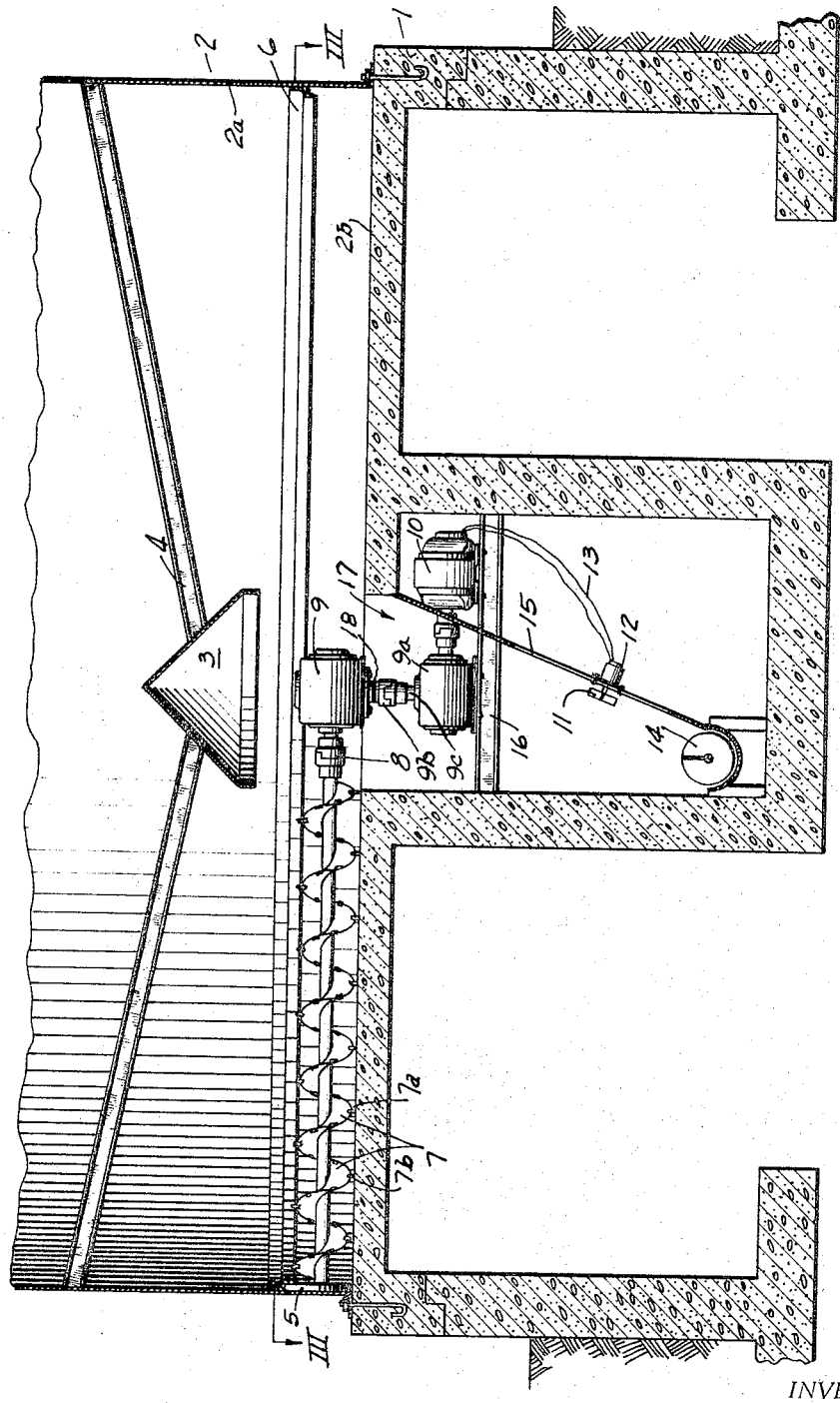
FIGURE 1 is a vertical sectional view of a bottom unloading mechanism employing the teachings of the instant invention.

Referring first to FIGURES 1 and 3, it will noted that similar parts have the same reference numerals. In a description of the mechanism embodying my invention, I have shown a base 1 supporting a bin or container 2 which is cylindrical in shape and has a sidewall 2a and a floor or bottom 2b. An opening 17 is centrally disposed in bottom 2b and opens into chute 15.

As will become more apparent hereafter, material stored in container 2 is, in accordance with my invention, drawn to the opening 17 and falls out therethrough into chute 15 so as to accomplish unloading of the material stored in the container 2. Chute 15 terminates at lower conveyer screw 14 (of the type which is described in U.S. Patent No. 2,723,021, which disclosure is incorporated herein by reference). The screw conveyer 14 is capable of transporting the unloaded material to a further desired location.

In accordance with my invention, I provide bin unloading means, in the form of an upper conveyor screw 7, which lies in a generally parallel plane to the bottom 2b of the container 2 and extends from the center of the container substantially to the sidewall 2a. While in the embodiment of my invention illustrated in FIGURES 1 and 3, I have shown a single conveyer screw 7 it will be appreciated that it would not depart from my invention to use two or more conveyer screws. In the preferred embodiment of my invention it is preferable to use a single conveyer screw because of the economical and power requirements involved.

Means are provided for rotating the upper conveyer screw 7 about its longitudinal axis. These means include a motor 10 with its output shaft connected with an input shaft of a bevel gear reduction box 9a which in turn has its output shaft connected to a further bevel gear box 9 which has its output shaft connected with the conveyer screw 7 through coupling means 8. Thus, the motor imparts rotating driving motion, which is reduced and transmitted through a 90° angle to the gear box 9a which further transmits the driving rotational force through a second 90° angle imparting the rotational force to the conveyer screw 7 causing it to rotate about its longitudinal axis and to perform in accordance with the instant invention by drawing the material in the container toward opening 17.

As may be seen from the drawings, upper conveyer screw 7 has an inner end positioned adjacent to opening 17, the outer end of the conveyer screw being positioned adjacent to sidewall 2a of container 2. The inner end of the conveyer screw 7 is supported on the bevel gear box 9 which has a radial thrust bearing 18, diagrammatically shown, supporting the weight of the gear housing upon the shoulder of coupling 9b which connects the output shaft of the gear box 9a and the input shaft of gear box 9. The radial thrust bearing 18 is thus capable of supporting the weight of gear box 9 while allowing it to rotate free about the vertical axis of the output shaft 9c due to the torque action imparted to it by the conveyer screw 7. Thus, the bearing 18 permits rotation or swinging movement of the conveyer screw 7 about a vertical axis in a plane which is parallel to bottom 2b of the container 2.

It will be seen from the drawings that upper conveyer screw 7 just clears the bottom 2b. The flutes of conveyer screw 7 are from ½″ to 2½″ from the bottom 2b. It will further be noted from the drawings that conveyer screw 7 is provided with agitators or teeth 7a and 7b. These teeth are so connected to the flutes of conveyer screw 7 as to be substantially normal to the outermost edge of the flutes and thereby able to "bite" into the material stored in container 2. These teeth 7a and 7b are ¼″ to 2¼″ in length and ¼″ to 1½″ in width and are fastened to the flutes by any desired means, as for example, by welding.

At the end of the conveyer screw shaft, adjacent to the sidewall 2a, there is attached a wheel 5, best seen in FIGURE 1. The wheel 5 is secured coaxially to the outer end of the screw so that it will rotate in the direction of rotation with the conveyer screw 7 as it works its way around container 2. The wheel 5 may be attached by any desirable means to the conveyer screw shaft, as for example, by welding. It will be understood, of course, that if it is desirable, bearings may be used to permit the conveyer shaft 7 to have independent rotational speed of the wheel 5. It will be noticed from FIGURES 1 and 3 that an annular guide bar 6 is secured to the sidewall 2a directly above the wheel 5 so as to prevent the wheel 5 from climbing upwardly into the material being unloaded. While I have illustrated the guide bar 6 as being a Z-bar it will be understood, of course, that it may be of any other desired shape, as for example an angle iron. I have found that generally, for best operating conditions, the wheel diameter should be from 2″ to 4″ greater than the corresponding diameter of the conveyer screw 7 (measured from the outermost tips of the flutes). It will be understood, of course, that any other relative proportion of wheel diameter to screw diameter could be used, as long as the wheel diameter is greater than the screw diameter plus the length of teeth 7a and 7b.

In order to prevent materials, such as grain, stored in container 2 from either falling directly through the container 2 and opening 17, or from falling at an undesired rate through opening 17 of container 2, a coarse control 3 is placed over and above the opening 17. This coarse control or deflector, illustrated in FIGURE 1 as a cone having its apex facing the top of the container, projects far enough over the diameter of opening 17 to prevent a substantial amount of material from directly escaping out through opening 17, and is designed bearing in mind the normal angle of response of the material to be stored in container 2. The coarse control 3 is provided with support means 4, which are attached to sidewall 2a. Support means 4 are adjustable, and are preset in accordance with the nature of the material to be stored in the container, being secured to sidewalls 2a by any suitable means, as for example by welding, bolting, riveting and the like.

The material sorted in container 2 will exert a downward pressure, through gravity, upon bottom 2b and conveyer screw 7. Power supplied to conveyer screw 7 causes it to rotate in a clockwise direction about its longitudinal axis, as viewed from the power input source. As conveyer screw 7 is caused to rotate teeth 7a and 7b will bite into the stored material and thereby simultaneously draw the stored material toward opening 17 and propel the conveyer screw into the material. It will be noticed that conveyer screw 7 and upper gear housing 9 rotate about a vertical axis in a clockwise direction about container 2, as viewed from overhead. Thus, as conveyer screw 7 rotates about container 2, wheel 5 will also rotate but will remain adjacent to bottom 2b and thus prevent conveyer screw 7 from climbing into the material being unloaded which it would naturally tend to do, causing a bending or breaking. When conveyer screw 7 is rotated about its axis it will also, simultaneously, tend to draw the material stored in container 2 toward opening 17 at a predetermined rate, in accordance with the pitch of its flutes and speed of rotation.

The center hole 17 may be of any size depending upon the overall diameter of container 2 and the desired rate of unloading of the material stored therein. Hole 17 leads directly to chute 15 which is provided with a sloping wall terminating at the end of the lower conveyer screw 14. Along the sloping wall of chute 15 there is provided a fine control means 11, best illustrated in FIGURE 1, controlling the rate of unloading the material in the container 2. The fine control 11 includes a paddle-like wheel arrangement capable of detecting when the material in chute 15 rises to a level approximately parallel to the fine control. Fine control 11 is connected to a conventional shaded pole motor 12 which is equipped with a centrifugal switch, operationally connected through wires 13 to motor 10. Thus, when the stored material reaches a level parallel with the fine control 11, thereby preventing further rotation of the paddle wheel the centrifugal switch, through wires 12 shuts off the energy input to motor 10, thereby preventing further rotation of conveyer screw 7. When the level of material falls below the paddle wheel and it once again begins to rotate, the centrifugal switch then reactivates motor 10 and conveyer screw 7 once again begins to draw material toward opening 17. The slanted wall of chute 15 is provided with means allowing full vertical adjustment of the paddle wheel from a practical minimum of three inches to a practical maximum of six feet. Of course, if desired, a much larger chute may be provided.

It will be further noted from the drawings that I have provided adequate support means 16 positioned within the center hole 17 so as to support the drive motor and gear housing used to effect the desired rotation of the conveyer screw.

Referring now to FIGURE 2 of the illustrations, it will be seen that I have illustrated a further embodiment of my invention. A supporting base 21 and a circular container 22 with a sidewall 22a and a bottom 22b are substantially the same as described in connection with FIGURE 1. In the center of container 22 there is provided a hole 30 leading to a sloping chute 29 which terminates at any desired location. A support means 28 is provided within the center hole 30 to support a bearing 27 upon which a motor 26 rests. The output shaft of the motor 26 is connected through a conventional connecting couple 25 to the end of a conveyer screw 20. The conveyer screw 20 extends from the center of the container 22 to the sidewall 22a, being connected at its outer end to a circular disk or wheel 24, which is capable of rolling about the annular edge of the circular container 22 at bottom 22b. The conveyer screw 20 is provided with agitators 20a and 20b, similar to those described as 7a and 7b in FIGURE 1. There is provided an annular restraining guide bar 23 to prevent the circular disk 24 from ascending into the material stored within container 22. The coarse and fine controls (not shown) are identical to those described as reference numerals 3 and 11 in conjunction with FIGURE 1. If desired, the conveyer screw 20 can be rotated at a much faster rate, i.e., with no reduction of rotational rate imparted from motor 26, because restraining bar 23 prevents disk 24 and consequently conveyer screw 20, from climbing into the material being unloaded. Further, there is no need for any bevel gearing, either to reduce speed of rotation or to transmit it through an angle.

It will be seen that in accordance with my invention, means are provided for rotating a conveyer screw in a plane which is at least substantially parallel to the bottom of a container. These means comprise a wheel or disk member mounted on the outer end of the conveyer screw, in close proximity to the sidewall of the container. A guide rail, or track which is circular in plan, is provided along the sidewall around the periphery thereof. The guide rail or track for the wheel is such as to present a restraining force upon the wheel, if and when the wheel attempts to move in an upwardly direction. Thus, the guide bar is capable of restraining the wheel and the conveyer screw in a close working relationship to the bottom of the container thereby preventing bending or breaking of the conveyer screw. I have further provided means to control the rate of discharge of the material from the container.

It will be understood, of course, that modifications and variations may be effected without departing from the spirit and scope of the novel concepts of the present invention.

I claim as my invention:

1. In a container adapted to unloading of particulate material through a central opening in the bottom thereof, vertically adjustable deflector means above said central opening in operative relation to said bottom, conveying means lateral of the opening and in operative relationship to said bottom, said conveying means extending substantially from the sidewall of said container to said central opening, power supply means connected to said conveying means capable of rotating said conveying means about its longitudinal axis, a wheel-like member attached to the outer end of said conveying means and in frictional contact with said bottom, restraining means in working relationship with said wheel-like member preventing said conveying means from ascending into said particulate material, whereby said power supply means rotating said conveying means about its longitudinal axis causing frictional engagement of said wheel-like member with said bottom whereby said conveying means is caused to rotate about said container due to said frictional contact thereby unloading said particulate material uniformly from said bottom at a desired rate.

2. In a container adapted to unloading of particulate material through a central opening in the bottom thereof, vertically adjustable deflector means above said central opening in operative relation to said bottom, conveying means lateral of the opening and in operative relationship to said bottom, said conveying means extending substantially from the sidewall of said container to said central opening, a rotational member rigidly attached to said conveying means in close-running relationship to said sidewall of the container, power supply means connected to said conveying means capable of rotating said conveying means about its longitudinal axis, restraining means in working relationship with said rotational member preventing said conveying means from ascending into said particulate material, unloading rate control means operationally connected to said power supply means and being responsive to the flow of particulate material through said central opening whereby said power supply means rotates said conveying means about its longitudinal axis, which rotation causes said conveying means to rotate about said container in a substantially horizontal plane thereby unloading said particulate material uniformly from said bottom at a desired rate.

3. In a container adapted to unloading of particulate material through a central opening in the bottom thereof, vertically adjustable deflector means above said central opening in operative relation to said bottom, conveying means lateral of the opening and in operative relationship to said bottom, said conveying means extending substantially from the sidewall of said container to said central opening, power supply means connected to said conveying means capable of rotating said conveying means about its longitudinal axis, a wheel rigidly attached to said conveying means at its outer end and being in frictional contact with said bottom, restraining means in working relationship with said wheel preventing said conveying means from ascending into said particulate material, unloading rate control means operationally connected to said power supply means and being responsive to the flow of particulate material through said central opening whereby said power supply means rotates said conveying means about its longitudinal axis causing frictional engagement of said wheel with said bottom whereby said conveying means is caused to sweep about said container due to said frictional contact thereby unloading said particulate material uniformly from said bottom at a desired rate.

4. In a container adapted to unloading of particulate material through a central opening in the bottom thereof, vertically adjustable deflector means above said central opening in operative relation to said bottom, conveying means lateral of the opening and in operative relationship to said bottom and out of contact with said bottom, said conveying means extending substantially from the sidewall of said container to said central opening, a wheel-like member connected to said conveying means at its outer end and in frictional contact with said bottom, teeth-like members attached to the outer periphery of said conveying means, being normal to said outer periphery of said conveying means, power supply means connected to said conveying means capable of rotating said conveying means about its longitudinal axis, restaining means in working relationship with said wheel-like member preventing said conveying means from ascending into said particulate material, whereby said power supply means rotates said conveying means about its longitudinal axis causing frictional engagement of said wheel-like member with said bottom whereby said conveying means is caused to sweep about said container due to said frictional contact thereby unloading said particulate material uniformly from said bottom at a desired rate.

5. In a container adapted to unloading of particulate material through a central opening in the bottom thereof, vertically adjustable deflector means above said central opening in operative relation to said bottom, conveying means lateral of the opening and in operative relationship to said bottom, said conveying means extending substantially from the sidewall of said container to said central opening, power supply means connected to said conveying means capable of rotating said conveying means about its longitudinal axis, a rotational member attached to said conveying means at its outer end and being in frictional contact with said bottom, an annular guide rail attached to the sidewall of said container and presenting a working face to said rotational member preventing said conveying means from ascending into said particulate materials, whereby said power supply means rotates said conveying means about its longitudinal axis causing frictional engagement of said rotational member with said bottom whereby said conveying means is caused to sweep about said container due to said frictional contact thereby unloading said particulate material uniformly from said bottom at a desired rate.

6. In a container adapted to unloading of particulate material through a central opening in the bottom thereof, vertically adjustable deflector means above said central opening in operative relation to said bottom, conveying means lateral of the opening and in operative relationship to said bottom, said conveying means extending substantially from the sidewall of said container to said central opening, a wheel rigidly attached to the outer end of said conveying means, power supply means connected to said conveying means capable of rotating said conveying means about its longitudinal axis, restraining means in working relationship with said wheel preventing said conveying means from ascending into said particulate material, a paddle wheel member connected to said power supply means capable of controlling energy input to said power supply in accordance with the level of particulate material around said paddle wheel member whereby said power supply means rotates said conveying means about its longitudianl axis, which rotation causes said conveying means to sweep about said container in a substantially horizontal plane thereby unloading said particulate material uniformly from said bottom at a desired rate.

7. In a container adapted to unloading of particulate material through a central opening in the bottom thereof, vertically adjustable deflector means above said central opening in operative relation to said bottom, conveying means lateral of the opening and in operative relationship to said bottom, said conveying means extending substantially from the sidewall of said container to said central opening, a wheel-like member connected to said conveying means at its outer end and in frictional contact with said bottom, said wheel-like member being from 2 to 4 inches greater in diameter than said conveying means, power supply means connected to said conveying means capable of rotating said conveying means about its longitudinal axis, said wheel-like member being in frictional contact with said bottom, restraining means in working relationship with said wheel-like member preventing said conveying means from ascending into said particulate material, whereby said power supply means rotates said conveying means about its longitudinal axis causing frictional engagement of said wheel-like member with said bottom whereby said conveying means is caused to rotate about said container due to said frictional contact thereby unloading said particulate material uniformly from said bottom at a desired rate.

8. In a container adapted to unloading of particulate material through a central opening in the bottom thereof, vertically adjustable deflector means above said central opening in operative relation to said bottom, conveying means lateral of the opening and in operative relationship to said bottom, said conveying means extending along an axis substantially from the sidewall of said container to said central opening, a wheel-like member connected to said conveying means at its outer end and in frictional contact with said bottom, an annular guide rail attached to the sidewall of said container and presenting a working face to said wheel-like member, said annular guide rail being in close running relationship to said wheel-like member, power supply means connected to said conveying means capable of rotating said conveying means about its longitudinal axis, whereby said power supply means rotates said conveying means about its longitudinal axis causing frictional engagement of said wheel-like member with said bottom whereby said conveying means is caused to sweep about said container due to said frictional contact, said annular guide rail preventing said wheel-like member from ascending into the particulate material thereby unloading said particulate material uniformly from said bottom at a desired rate without bending the axis of said conveying means.

9. In a container adapted to unloading of particulate material through a central opening in the bottom thereof, vertically adjustable deflector means above said central opening in operative relation to said bottom, conveying means lateral of the opening and in operative relationship to said bottom, said conveying means extending substantially from the sidewall of said container to said central opening, a wheel attached to the outer end of said conveying means, power supply means connected to said conveying means capable of rotating said conveying means about its longitudinal axis, restraining means in working relationship with said wheel preventing said conveying means from ascending into said particulate material, a paddle wheel member connected to said power supply means capable of controlling energy input to said power supply in accordance with the level of particulate material around said paddle wheel member, said paddle wheel member being vertically adjustable, whereby said power supply means rotates said conveying means about its longitudinal axis, which rotation causes said conveying means to sweep about said container in a substantially horizontal plane thereby unloading said particulate material uniformly from said bottom at a desired rate.

10. In a circular container adapted to receive materials to be unloaded from said container through a central opening in the bottom thereof, vertically adjustable deflector means above said central opening in operative relation to said bottom, a deflector cone positioned above said central opening, support means connecting said deflector cone to the sidewall of said container and being vertically adjustable, an annular guide rail attached to the sidewall of said container and presenting a working face toward said bottom, a conveyer screw lateral of said opening and adjacent to said bottom, said conveyer screw extending substantially from the sidewall of said container to said central opening, teeth-like members attached to the outer periphery of said conveyer screw and being normally positioned thereon, a wheel-like member coaxially connected to said conveyer screw at its outer end, being in frictional contact with said bottom and in close running relationship to said annular guide rail, power supply means connected to said conveyer screw capable of rotating said conveyer screw about its longitudinal axis, bearing means between said power supply means and said conveyer screw permitting said conveyer screw to rotate about its longitudinal axis and simultaneously to sweep about said container, a paddle wheel indicator positioned below said central opening operatively connected to said power supply means and being responsive to the flow of particulate material through said central opening, a second conveyer screw positioned below said paddle wheel indicator for transporting the particulate material off.

References Cited

UNITED STATES PATENTS

| 2,111,663 | 3/1938 | Graemiger | 222—56 |
| 2,617,351 | 11/1952 | Graham et al. | 214—17 X |
| 2,934,224 | 4/1960 | Puckett | 214—17 |
| 3,121,501 | 2/1964 | Laidig | 214—17 |

FOREIGN PATENTS

| 412,214 | 4/1925 | Germany. |

GERALD M. FORLENZA, *Primary Examiner.*

R. G. SHERIDAN, *Assistant Examiner.*